(12) United States Patent
Ozaki

(10) Patent No.: US 10,643,562 B2
(45) Date of Patent: May 5, 2020

(54) DISPLAY DEVICE AND METHOD FOR DRIVING THE SAME

(71) Applicant: Japan Display Inc., Minato-ku (JP)

(72) Inventor: Tadafumi Ozaki, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 37 days.

(21) Appl. No.: 16/162,908

(22) Filed: Oct. 17, 2018

(65) Prior Publication Data

US 2019/0130860 A1 May 2, 2019

(30) Foreign Application Priority Data

Oct. 27, 2017 (JP) ................................ 2017-208085

(51) Int. Cl.
*G09G 3/36* (2006.01)
*G02F 1/1343* (2006.01)

(52) U.S. Cl.
CPC ..... *G09G 3/3677* (2013.01); *G02F 1/134309* (2013.01); *G09G 3/3614* (2013.01); *G09G 3/3655* (2013.01); *G02F 2201/121* (2013.01); *G09G 2300/0426* (2013.01); *G09G 2300/0866* (2013.01); *G09G 2310/0235* (2013.01); *G09G 2310/08* (2013.01)

(58) Field of Classification Search
CPC .. G09G 3/3677; G09G 3/3614; G09G 3/3655; G09G 2300/0426; G09G 2300/0866; G09G 2310/0235; G09G 2310/08; G02F 1/134309; G02F 2201/121
See application file for complete search history.

(56) References Cited

U.S. PATENT DOCUMENTS

| 8,089,570 B2* | 1/2012 | Kim | G09G 3/3659 |
| | | | 345/92 |
| 8,144,099 B2* | 3/2012 | Kojima | G09G 3/3655 |
| | | | 345/94 |
| 8,531,371 B2* | 9/2013 | Yoon | G09G 3/3614 |
| | | | 345/96 |
| 2007/0139327 A1* | 6/2007 | Liu | G09G 3/3614 |
| | | | 345/89 |
| 2008/0198124 A1* | 8/2008 | Kojima | G09G 3/3655 |
| | | | 345/96 |

(Continued)

FOREIGN PATENT DOCUMENTS

JP 2001-272657 10/2001
JP 2005-024755 1/2005

*Primary Examiner* — Peter D McLoone
(74) *Attorney, Agent, or Firm* — Oblon, McClelland, Maier & Neustadt, L.L.P.

(57) ABSTRACT

A display device including applying a positive polarity first voltage with respect to the plurality of first electrodes to the plurality of second electrodes, and applying a voltage according to an image signal to one of the plurality of first electrodes in a first time period, applying a negative polarity second voltage with respect to the plurality of first electrodes to the plurality of second electrodes, and applying a voltage according to an image signal to one of the plurality of first electrodes in a second time period, and applying to the plurality of first electrodes a common voltage larger than a minimum value of an allowable range of a voltage according to an image signal applied to one of the plurality of first electrodes and determined in a range equal to or less than the first voltage in a third time period.

10 Claims, 14 Drawing Sheets

(56) References Cited

U.S. PATENT DOCUMENTS

| | | | | |
|---|---|---|---|---|
| 2011/0037913 A1* | 2/2011 | Kim | ............... | G09G 3/3659 349/37 |
| 2011/0169799 A1* | 7/2011 | Yoon | ............... | G09G 3/3614 345/211 |
| 2012/0113084 A1* | 5/2012 | Yang | ............... | G09G 3/3655 345/212 |

* cited by examiner

DISPLAY DEVICE AND METHOD FOR DRIVING THE SAME

CROSS REFERENCE TO RELATED APPLICATIONS

This application is based upon and claims the benefit of priority from the prior Japanese Patent Application No. 2017-208085, filed on Oct. 27, 2017, the entire contents of which are incorporated herein by reference.

FIELD

An embodiment of the present invention is related to a display device and a method for driving the display device.

BACKGROUND

A display device which uses liquid crystals is widely used as a display device for a notebook computer, a liquid crystal television or mobile information terminal and the like. The principle operation of the liquid crystal is, for example, a TN (Twisted Nematic) mode or an STN (Super Twisted Nematic) mode and the like. In recent years, a display device of a polymer dispersed liquid crystal system (PDLC system) is attracting attention. In the case when no voltage is applied, the PDLC is in an opaque white state, and in the case when a voltage is applied, the PDLC becomes transparent. In the PDLC type display device which utilizes this characteristic, for example, lighting and shielding of a glass window can be realized by turning the power supply on and off. In addition, the PDLC system display device can realize a wide viewing angle without using a polarization plate.

A liquid crystal display device which uses a field sequential type driving method can perform color display by sequentially lighting the light sources of a plurality of single colors. That is, color display can be performed without the use of a color filter. A liquid crystal display device which uses a field sequential type driving method can realize the same resolution as compared with a display device using a color filter with just ⅓ of the number of pixel. In addition, a liquid crystal display device which uses a field sequential type driving method has the advantage that light transparency is not lost due to a color filter. In addition, in a liquid crystal display device which uses a field sequential type driving method, it is possible to realize a uniform display by arranging a batch reset or the like for applying a signal which erases data to a plurality of pixels.

SUMMARY

One embodiment of the present invention is a display device including a plurality of first electrodes, a plurality of second electrodes arranged facing the plurality of first electrodes respectively, an electro-optical element arranged sandwiched between the plurality of first electrodes and the plurality of second electrodes, and changing optical characteristics based on an applied voltage, a transistor including a first terminal connected to an image signal line, a second terminal connected to one of the plurality of first electrodes, and a gate terminal connected to a scanning signal line and controlling conduction between the first terminal and the second terminal, and a control circuit controlling a voltage supplied to the image signal line, the scanning signal line and the plurality of second electrodes, applying a positive polarity first voltage with respect to the plurality of first electrodes to the plurality of second electrodes, and applying a voltage according to an image signal to one of the plurality of first electrodes in a first time period, applying a negative polarity second voltage with respect to the plurality of first electrodes to the plurality of second electrodes, and applying a voltage according to an image signal to one of the plurality of first electrodes in a second time period after the first time period, and applying to the plurality of first electrodes a common voltage larger than a minimum value of an allowable range of a voltage according to an image signal applied to one of the plurality of first electrodes and determined in a range equal to or less than the first voltage in a third time period between the first time period and the second time period.

One embodiment of the present invention is a method for driving a display device, the display device including a plurality of first electrodes, a plurality of second electrodes arranged facing the plurality of first electrodes respectively, an electro-optical element arranged sandwiched between the plurality of first electrodes and the plurality of second electrodes, and changing optical characteristics based on an applied voltage, a transistor including a first terminal connected to an image signal line, a second terminal connected to one of the plurality of first electrodes, and a gate terminal connected to a scanning signal line and controlling conduction between the first terminal and the second terminal, and a control circuit for controlling a voltage supplied to the image signal line, the scanning signal line and the plurality of second electrodes, the method comprising applying a positive polarity first voltage with respect to a plurality of first electrodes to a plurality of second electrodes arranged facing the plurality of first electrodes, applying a voltage according to an image signal to one of the plurality of first electrodes, applying to the plurality of first electrodes a common voltage larger than a minimum value of an allowable range of a voltage according to an image signal applied to one of the plurality of first electrodes and determined in a range equal to or less than the first voltage, applying a negative polarity voltage with respect to the plurality of first electrodes to the plurality of second electrodes, and applying a voltage corresponding to an image signal to one of the plurality of first electrodes.

DESCRIPTION OF EMBODIMENTS

Figure 1:
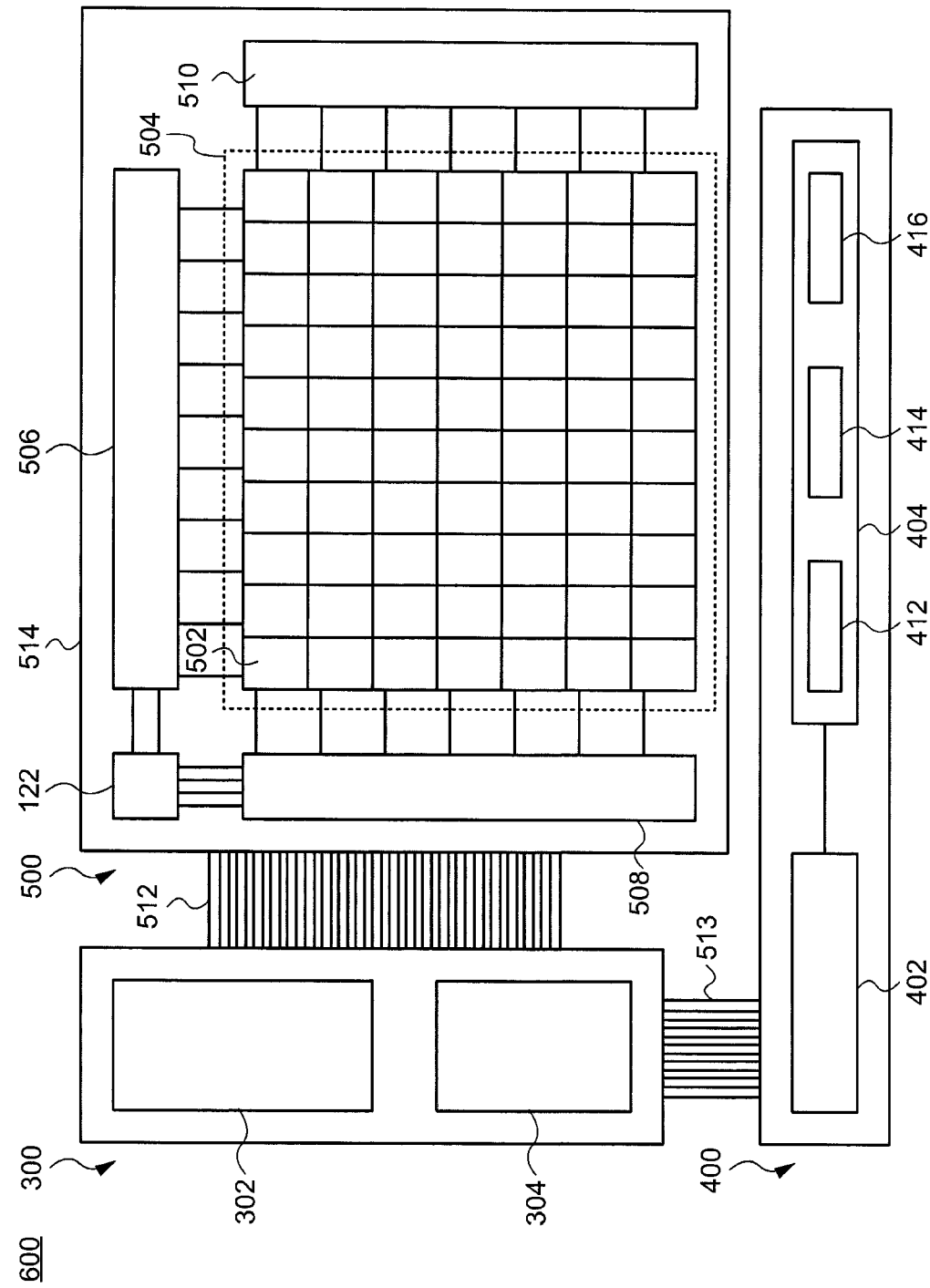
FIG. 1 is a schematic planar view diagram showing the structure of a display device related to one embodiment of the present invention.

The embodiments of the present invention are explained below while referring to the drawings. However, the present invention can be implemented in many different modes and should not to be interpreted as being limited to the content of the description in the embodiments exemplified below. In addition, although the drawings may be schematically represented in terms of width, thickness, shape, and the like of each part as compared with their actual mode in order to make explanation clearer, it is only an example and an interpretation of the present invention is not limited. Furthermore, in the present specification and each drawing, the same reference symbols (or symbols attached after numerals such as a or b and the like) are provided to the same elements as those described above with reference to preceding figures and a detailed explanation may be omitted accordingly. Furthermore, characters denoted by [first], [second] with respect to each element are convenient labels used for distinguishing each element and unless otherwise explained do not have any further meaning.

By using the field sequential type driving method, it is possible for a PDLC type display device to perform color display without using a color filter. However, the operating voltage of a PDLC type display device is about 60V which is very large compared to the operating voltage of a general liquid crystal display device which is about 10V. That is, power consumption of PDLC type display device increases.

Therefore, one aim of an embodiment of the present invention is to provide a display device with a low operating voltage and a driving method of the display device.

First Embodiment

The structure of a display device according to one embodiment of the present invention is explained in the present embodiment.

The present invention is based on a liquid crystal display device which uses a field sequential type driving method. In addition, the present invention is based on a liquid crystal display device which uses one of frame inversion driving or field inversion driving and also common inversion driving. In the present invention, a constant voltage is applied to all pixels in the display device before performing common inversion. The constant voltage is the maximum value of a fluctuation of the amplitude of a signal supplied to a common electrode. In addition, the pixel includes a transistor. The minimum value of a fluctuation of the amplitude of the signal supplied to the gate of the transistor is smaller than the minimum value of a fluctuation of the amplitude of the signal supplied to the common electrode. In addition, the maximum value of a fluctuation of the amplitude of the signal supplied to the gate of the transistor is larger than the maximum value of a fluctuation of the amplitude of the signal supplied to the common electrode. In the present invention, a constant voltage is applied to all the pixels of the display device before performing common inversion. By using the present invention, it is possible to reduce the amplitude of a signal supplied to the gate of a transistor included in a pixel by, for example, about 40%. In addition, by using the present invention, it is possible to reduce the required value with respect to a withstand voltage of a transistor by about 40%.

Furthermore, as an example, a frame is a period during which a voltage corresponding to an image signal for one screen is written in a display device and an image is displayed. In addition, as an example, frame inversion driving is when the polarity of a voltage corresponding to an image signal is switched for each frame from positive to negative or from negative to positive. In addition, as one example, field inversion driving is when a frame is divided and the polarity of the voltage corresponding to the image signal is switched from positive to negative or from negative to positive for each divided frame. A divided frame is called a field. In addition, as one example, common inversion driving is when a voltage applied to a common electrode is switched between a maximum value and a minimum value of a fluctuation of the amplitude of a signal applied to the common electrode for each frame or each field. The driving method of a display device may be a combination of frame inversion driving and common inversion driving. In addition, the driving method of a display device may be a combination of field inversion driving and common inversion driving.

FIG. 1 is a schematic diagram showing a structure of a display device 600 according to one embodiment of the present invention.

As is shown in FIG. 1, the display device 600 is arranged with, for example, a circuit substrate 300, a light source device 400 and a display panel 500.

The circuit substrate 300 includes at least a power supply part 302 and a signal supply part 304. The power supply part 302 can supply electric power to the light source device 400 via a connector 513 and operate the light source device 400. In addition, the power supply part 302 can supply power to the display panel 500 via a connector 512 and operate the display panel 500. The signal supply part 304 can supply an image signal for displaying on the display panel 500 and a signal for driving the display panel 500 to the light source device 400 via a connector 513. In addition, the signal supply part 304 can supply an image signal for displaying on the display panel 500 and a signal for driving the display panel 500 to the display panel 500 via the connector 512. A flexible printed circuit (FPC, Flexible Printed Circuit) can be used as the connector 512 and the connector 513.

The light source device 400 includes, for example, a light source control part 402 and a light source part 404.

The light source control part 402 controls the light source part 404, for example, based on a signal for driving the display panel 500 supplied from the signal supply part 304. The light source control part 402 controls on and off of the light source part 404. That is, the light source control part 402 controls irradiation of light to the display panel 500 and light shielding. The light source part 404 includes a light source. The light source is facing an electro-optical element described later. The light source is, for example, RLED (Red Light Emitting Diode) 412, GLED (Green Light Emitting Diode) 414, and BLED (Blue Light Emitting Diode) 416. By providing the light source part 404 with the RLED 412, the GLED 414 and the BLED 416, it is possible to provide a display device compatible with the field sequential type driving method.

The signal supply part 304 may include, for example, a microcontroller unit (MCU) and a memory circuit. The MCU reads a program stored in the memory circuit. The MCU can generate a signal which controls the display panel 500 and the light source device 400 according to the program which is read. In addition, according the program which is read, the MCU can divide and separately provide an image signal for displaying on the display panel 500 supplied from the signal supply part 304, and a signal for driving the display panel 500 to the display panel 500 and the light source device 400. Furthermore, the MCU may control the timing of a signal which is supplied to the signal supply part 304, the display panel 500 and the light source device 400. Furthermore, the signal supply part 304 may include an FPGA (Field Programmable Gate Array) instead of the MCU. The signal supply part 304 may also include both an MCU and an FPGA instead of the MCU. The FPGA can play the role of the MCU.

The display panel 500 includes a substrate 514, a display region 504, an image signal line drive circuit 506, a scanning signal line drive circuit 508, a scanning signal line drive circuit 510 and a control circuit 122.

A display region 504, an image signal line drive circuit 506, a scanning signal line drive circuit 508, a scanning signal line drive circuit 510 and a control circuit 122 are formed above a substrate 514. The connector 512 is connected to the substrate 514. Not all of the image signal line drive circuit 506, the scanning signal line drive circuit 508, the scanning signal line drive circuit 510 and the control circuit 122 have to be formed above the substrate 514. For example, a part of the image signal line drive circuit 506, the scanning signal line drive circuit 508, the scanning signal line drive circuit 510 and the control circuit 122 may be arranged above the substrate 514 or the connector 512. Alternatively, an integrated circuit (IC) (not shown in the diagram) including all the functions of the image signal line drive circuit 506, the scanning signal line drive circuit 508, the scanning signal line drive circuit 510 and the control circuit 122 may be formed above the substrate 514 or the connector 512.

The substrate 514 may be a hard base material such as a glass substrate or a substrate having flexibility. A hard base material such as a glass substrate can include materials exemplified by, for example, a glass substrate, a quartz substrate and a ceramic substrate. By using a hard base material such as a glass substrate for the substrate 514, it is possible to provide the display panel 500 with high rigidity. A base material having flexibility can include, for example, a material selected from polymer materials exemplified by polyimide, polyamide, polyester and polycarbonate. By using a flexible base material for the substrate 514, it is possible to provide a light and thin display panel 500.

The display region 504 includes a plurality of pixels 502. The plurality of pixels 502 are arranged in one direction and along a direction which intersects this direction. The arrangement number of the plurality of pixels 502 is arbitrary. For example, m pixels 502 are arranged in a direction X and n pixels 502 in a direction Y. m and n are each independently a natural number larger than 1. The display region 504 includes a region in which a pixel 502 is arranged along one direction and a direction intersecting this direction. Each of the pixels 502 has an electro-optical element. The electro-optical element is arranged sandwiched between two electrodes and changes optical characteristics based on a voltage applied between the two electrodes. The electro-optical element is, for example, a liquid crystal element.

The display panel 500 in one embodiment of the present invention can perform color display by sequentially lighting RLED 412, GLED 414 and BLED 416 using a field sequential type driving method. That is, it is possible to perform color display without using a color filter. A full color display device can be provided by supplying a voltage of 256 levels or a current to each pixel. The display panel 500 in one embodiment of the present invention requires only ⅓ the number of pixels compared with a display device using a color filter in order to realize the same resolution. In addition, the light transmittance in the display panel 500 in one embodiment of the present invention does not decrease due to a color filter compared with a display device which uses a color filter.

Figure 2:
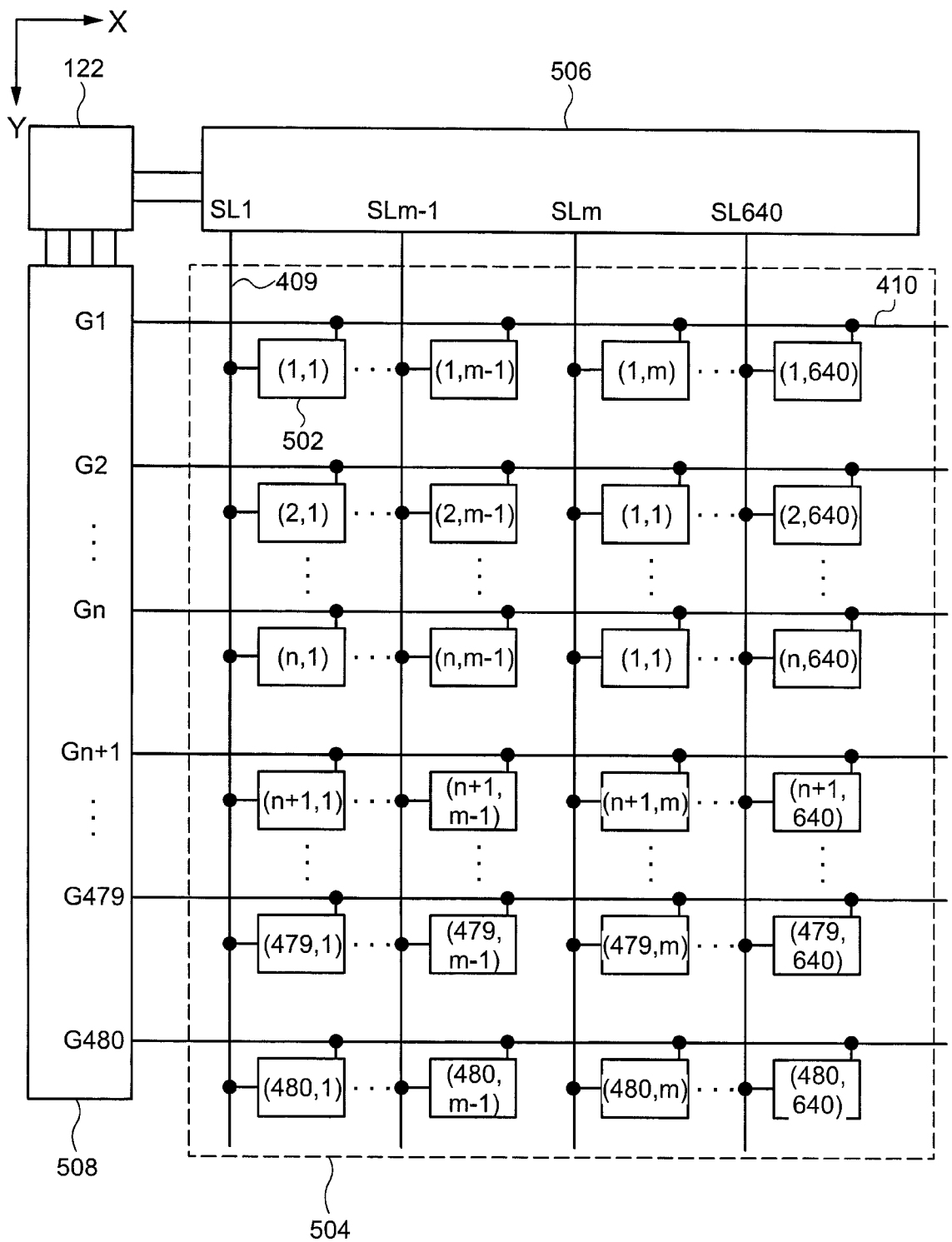
FIG. 2 is a schematic planar view diagram showing a display panel included in a display device related to one embodiment of the present invention.

FIG. 2 is a schematic planar diagram showing a display panel in a display device according to the embodiment of the present invention. An explanation of the same structure as in FIG. 1 is omitted. Furthermore, in the display region 504, a plurality of scanning signal lines 410 are arranged in a row direction, and a plurality of image signal lines 409 are arranged in a column direction.

An example is shown in which the display panel 500 has a display region with 480×640 pixels arranged in 480 rows and 640 columns. For example, the pixels of n rows m-1 column are represented by (n, m-1). The scanning signal line 410 of n rows is represented by Gn. The image signal line 409 of the m-1 column is represented by SLm-1.

The control circuit 122 supplies each signal and a power supply voltage to the image signal line drive circuit 506, the scanning signal line drive circuit 508 and the scanning signal line drive circuit 510. The control circuit 122 generates a new signal or a power supply voltage from each signal or power supply voltage and the like using a logic circuit (not shown in the diagram) or a voltage generating circuit (not shown in the diagram) included in the control circuit 122. A new signal or a power supply voltage from each generated signal or power supply voltage may be supplied to each of the image signal line drive circuit 506, the scanning signal line drive circuit 508 and the scanning signal line drive circuit 510.

For example, the image signal line drive circuit 506 supplies to the image signal line 409 a maximum value of a fluctuation of an amplitude or a minimum value of a fluctuation of an amplitude of an image signal for display on the display panel 500 and a signal to be supplied to a common electrode according to a signal for driving the display panel 500. The scanning signal line drive circuit 508 and the scanning signal line drive circuit 510 supply a first signal for controlling the gate of a transistor included in the pixel 502 or a second signal of a transistor included in the pixel 502 to the scanning signal line 410. It is possible to display an image in the display region 504 by driving the liquid crystal element included in the pixel 502 according to the supplied signal. Furthermore, the transistor included in the pixel 502 is explained using FIG. 3.

Figure 3:
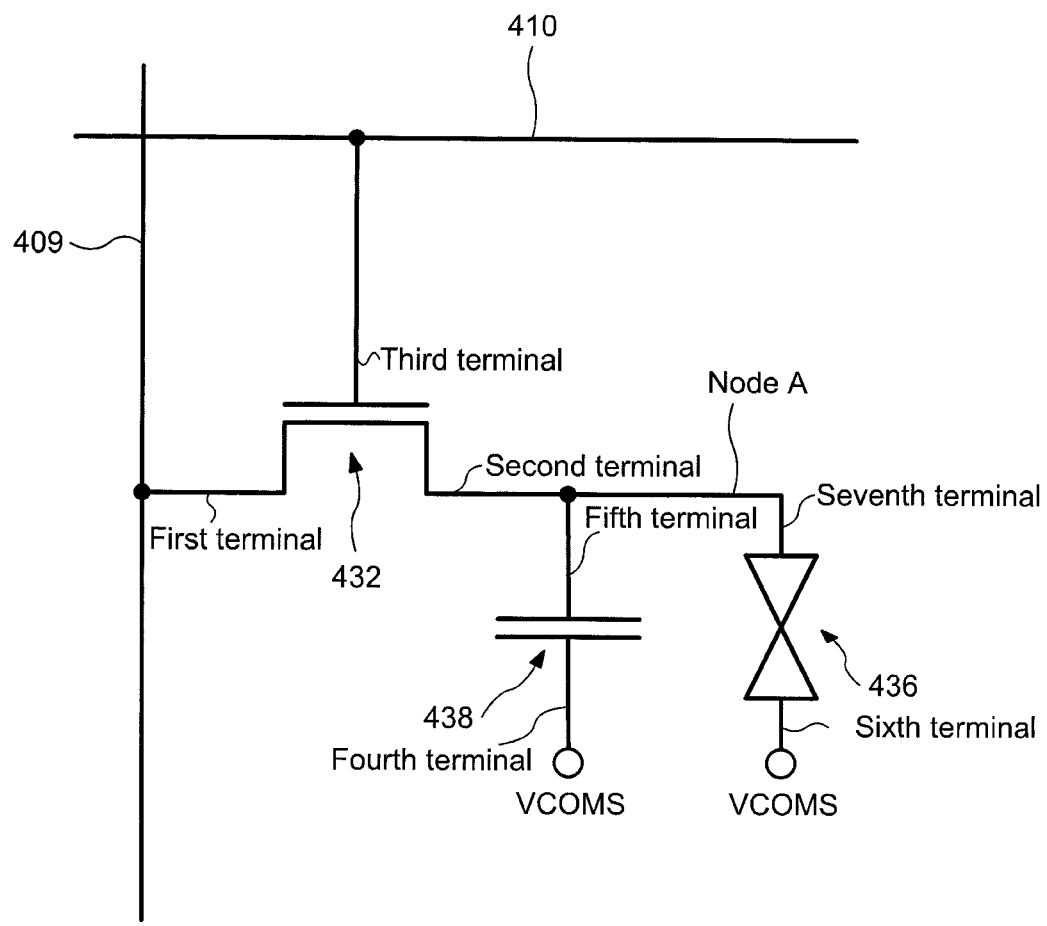
FIG. 3 is a circuit diagram showing a pixel circuit in a display device related to one embodiment of the present invention.

FIG. 3 is a circuit diagram showing a pixel circuit included in a display device according to one embodiment of the present invention. Furthermore, the pixel circuit in FIG. 3 is an example and is not limited thereto. An example in which an electro-optic element is a liquid crystal element is shown in FIG. 3.

Each of the pixels 502 includes a transistor 432, a liquid crystal element 436 and a storage capacitor 438.

One of the source or drain of the transistor 432 serves as a first terminal, the other of the source or drain of the transistor 432 serves as a second terminal, and the gate of the transistor 432 serves as a third terminal. One terminal of the storage capacitor 438 serves as a fourth terminal and the other terminal of the storage capacitor 438 serves as a fifth terminal. One terminal of the liquid crystal element 436 serves as a sixth terminal and the other terminal of the liquid crystal element 436 serves as a seventh terminal.

The third terminal is electrically connected to the scanning signal line 410. The first terminal is electrically connected to the image signal line 409. The second terminal is electrically connected to the fifth terminal and the seventh terminal. A point where the second terminal, the fifth terminal and the seventh terminal are electrically connected is called a node A.

An example is shown in which the fourth terminal is electrically connected to VCOMS. VCOMS is commonly arranged for a plurality of pixels 502. The fourth terminal may also be connected to the sixth terminal. The storage capacitor 438 holds an electric charge corresponding to a voltage which corresponds to an image signal written to the node A. Here, the voltage corresponding to the image signal written to the node A may be a voltage corresponding to the image signal input to the node A or maybe a voltage corresponding to the image signal supplied to the node A. The voltage corresponding to the image signal may be data corresponding to the gradation of a pixel.

The sixth terminal is a common electrode. VCOMS is connected to the common electrode. VCOMS is a signal line which supplies a voltage to the common electrode. The common electrode may be arranged in common to the plurality of pixels 502 or may be arranged for each of the plurality of pixels 502 respectively. In an example of one embodiment of the present invention, the common electrode is arranged in common to a plurality of pixels 502.

Figure 4:
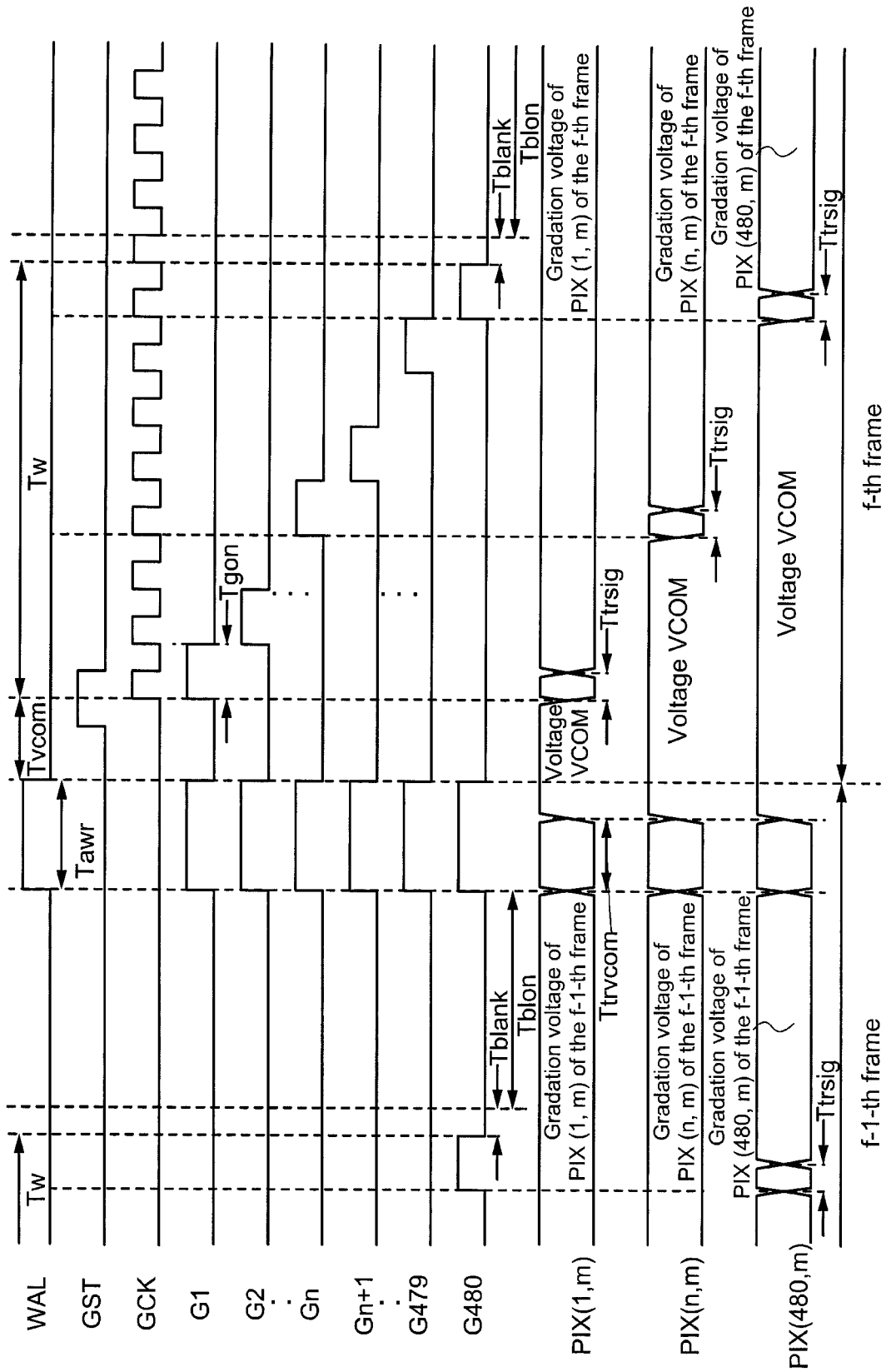
FIG. 4 is an example of a timing chart for explaining a driving method of a display device related to one embodiment of the present invention.

FIG. 4 is an example of a timing chart for explaining a driving method of a display device according to one embodiment of the present invention.

WAL is a signal line supplied with a first signal which is supplied to the gate of the transistor 432. The first signal is a signal for turning the transistor 432 to an ON state during a period Tawr before a potential of the signal supplied to the VCOMS changes due to common inversion. The amplitude of the first signal is, for example, 0V to 35V. By turning the transistor 432 to an ON state in the period Tawr, the maximum value of the fluctuation of the amplitude of the signal supplied to the VCOMS can be written to the node A. That is, a pixel is written with the maximum value of the fluctuation of the amplitude of the signal supplied to the VCOMS. For example, the maximum value of the fluctuation of the amplitude of the signal supplied to the VCOMS is 30V. Furthermore, the first signal may be supplied to the scanning signal line 410 from the scanning signal line drive circuit 508 and/or the scanning signal line drive circuit 510. The first signal may be supplied from the control circuit 122 to the scanning signal line 410. In the case when the first signal is supplied from the control circuit 122 to the scanning signal line 410, a switch may be arranged between the scanning signal line 410 and the scanning signal line drive circuit 508 and the scanning signal line drive circuit 510. It is possible to select which of the first signal and the scanning signal line drive circuit 508 or the scanning signal line drive circuit 510 is electrically connected to the scanning signal line 410 using the switch. Furthermore, in FIG. 4 an example is shown in which the first signal is supplied to the scanning signal line 410 from the scanning signal line drive circuit 508 and/or the scanning signal line drive circuit 510.

GST is a signal line serving as a trigger for generating a signal for writing a voltage corresponding to an image signal corresponding to each pixel. The signal which is a trigger for generating a signal for writing a voltage corresponding to an image signal corresponding to each pixel is a gate start pulse. GST is supplied to the scanning signal line drive circuit 508 and/or the scanning signal line drive circuit 510.

Figure 11:
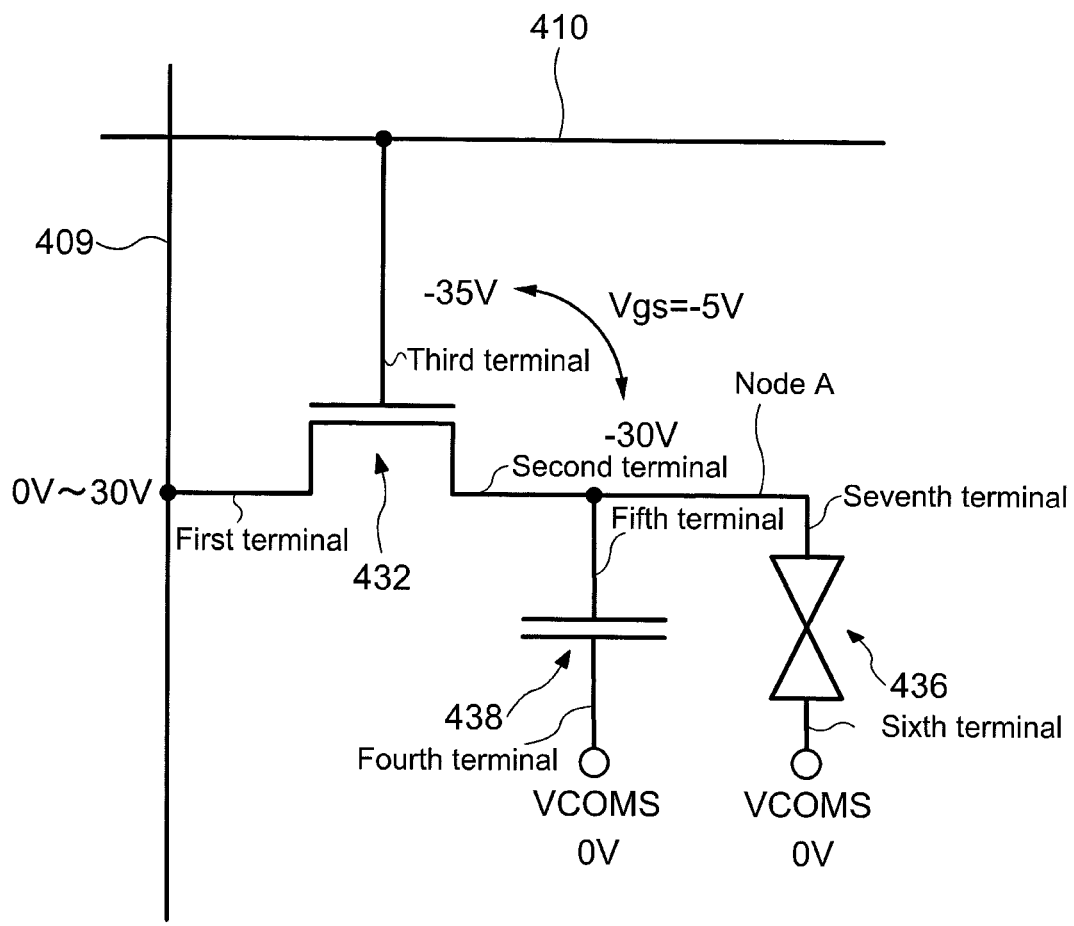
FIG. 11 is a schematic diagram showing an example of a voltage applied to a pixel circuit in a liquid crystal display device using a conventional PDLC.

GCK is a clock signal line. GCK is supplied to the scanning signal line drive circuit 508 and/or the scanning signal line drive circuit 510. The signal supplied to the scanning signal line drive circuit 508 and/or the scanning signal line drive circuit 510 is shifted by GCK. For example, as shown in FIG. 11, a signal which is obtained by shifting the gate start pulse supplied to the scanning signal line drive circuit 508 and/or the scanning signal line drive circuit 510 by a half cycle of GCK by GCK is a signal supplied to G1.

G1 is a scanning signal line 410 of a first row. Tgon indicates a period during which the maximum value of a fluctuation of an amplitude of a signal is supplied to G1

G2 is a scanning signal line 410 of a second row. In the signal supplied to G2, the signal supplied to G1 is shifted by one cycle by GCK.

As indicated by GST, G1 and G2, a signal supplied to the scanning signal line 410 is shifted by GCK and the transistor 432 which is electrically connected to the scanning signal line 410 in each row is controlled.

Gn is a scanning signal line 410 on the n-th row. Gn+1 is a scanning signal line 410 on the n+1-th row. G479 is a scanning signal line 410 on the 479th row. G480 is a scanning signal line 410 on the 480th row. Tblon is a period during which a light source part 404 is ON. Tblank is a period from when a signal is supplied to G480 until the light source part 404 is turned ON. Furthermore, the first signal is supplied from G1, G2, Gn to Gn+1, G479 and G480 so that the transistor 432 is turned ON during the period Tawr.

PIX (1, m) indicates a signal supplied to a pixel on the 1st row and m-th column. In the f-1-th frame, a gradation voltage of PIX (1, m) of the f-1-th frame is supplied to PIX (1, m). In the f-th frame, a gradation voltage of PIX (1, m) of the f-th frame is supplied to PIX (1, m). In the period Tawr, Trvcom is a period during which a signal which has an indeterminate voltage corresponding to an image signal is supplied. In the period Tawr, a maximum value of a fluctuation of the amplitude of a signal supplied to a common electrode is supplied after the signal of an indeterminate voltage corresponding to the image signal is supplied. The maximum value of the fluctuation of the amplitude of the signal supplied to the common electrode is the voltage VCOM.

PIX (n, m) indicates a signal which is supplied to a pixel of an n-th row and m-th column. In the f-1-th frame, the gradation voltage of PIX (n, m) of the f-1-th frame is supplied to PIX (n, m). In the f-th frame, the gradation voltage of PIX (n, m) of the f-th frame is supplied to PIX (1, m). In the period Tawr, Trvcom is a period during which a signal which has an indeterminate voltage corresponding to an image signal is supplied. In the period Tawr, the maximum value of the fluctuation of the amplitude of a signal supplied to a common electrode is supplied after the signal which has an indeterminate voltage corresponding to the image signal is supplied. The maximum value of the fluctuation of the amplitude of the signal supplied to the common electrode is the VCOM voltage.

PIX (480, m) indicates a signal which is supplied to a pixel on the 480th row and n-th column. In the f-1-th frame, a gradation voltage of the f-1-th frame PIX (480, m) is supplied to PIX (480, m). In the f-th frame, a gradation voltage of the f-th frame PIX (480, m) is supplied to PIX (480, m). In the period Tawr, Trvcom is a period during which a signal which has an indeterminate voltage corresponding to an image signal is supplied. In the period Tawr, the maximum value of a fluctuation of the amplitude of the signal supplied to a common electrode is supplied after the signal which has an indeterminate voltage corresponding to the image signal is supplied. The maximum value of the fluctuation of the amplitude of the signal supplied to the common electrode is indicated as a VCOM voltage.

The gradation voltage is, for example, a voltage corresponding to an image signal.

As is shown in FIG. 4, in the period Tawr, after all the pixels are supplied with a signal which has an indeterminate voltage corresponding to the image signal is supplied, all the pixels are supplied with the maximum value of the fluctuation of the amplitude of the signal supplied to the common electrode. The maximum value of the fluctuation of the amplitude of the signal supplied to the common electrode is the VCOM voltage. For example, the VCOM voltage is 30V. Furthermore, Ttrsig is a period from when each scanning signal line 410 begins to rise until the voltage supplied to each pixel is determined.

Furthermore, Tvcom is a period during which the maximum value of a fluctuation of an amplitude of the signal supplied to the common electrode is supplied to all the pixels and is the supplied voltage is held. In addition, Tw is a period during which a voltage corresponding to an image signal is written to a pixel.

Figure 5:
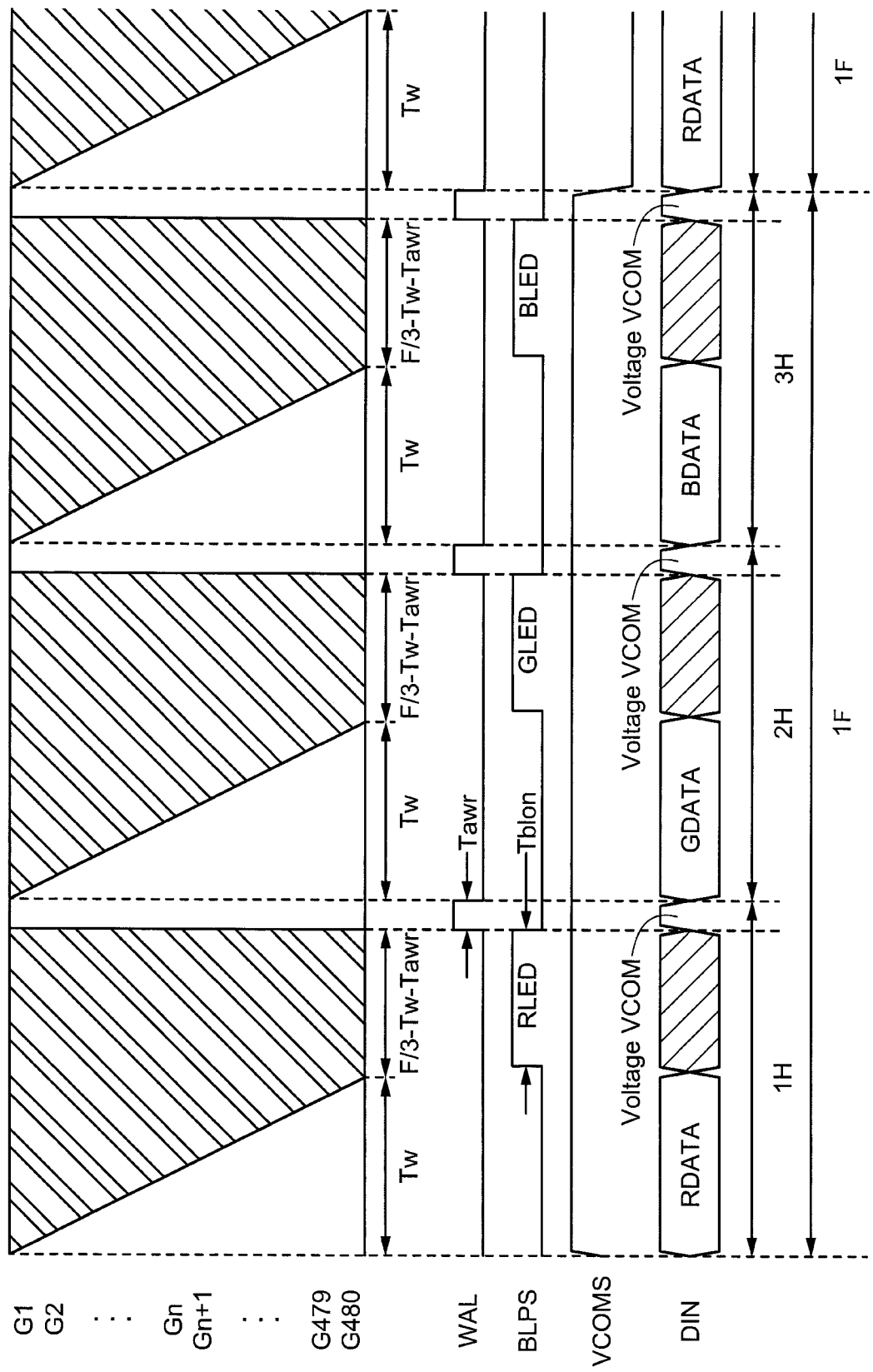
FIG. 5 is an example of a timing chart for explaining a driving method of a display device related to one embodiment of the present invention.

FIG. 5 is an example of a timing chart for explaining a driving method of a display device according to one embodiment of the present invention.

In FIG. 5, one frame period is divided into three. The divided period is assumed to be one field. That is, one frame period is divided into three field periods. In a first period (1H), RLED 412 of the light source part 404 is turned on and a red image is displayed. In a second period (2H), GLED 414 of the light source part 404 is turned on and a green image is displayed. In a third period (3H), BLED 416 of the light source part 404 is turned on and a blue image is displayed.

As one example, FIG. 5 shows an example in which one frame (1F) period is 16.68 ms, that is, 60 Hz. One field is 5.56 ms.

1H is explained. A timing chart in which G1, G2, Gn, Gn+1, G479 and G480 are described indicates that a voltage corresponding to an image signal is written to a pixel 502 of the display panel 500 and an image is displayed on the display panel 500. In the timing chart describing G1, G2, Gn, Gn+1, G479 and G480, Tw in the shaded part indicates a period in which a voltage corresponding to an image signal is written to a pixel 502 in the sequence G1, G2, Gn, Gn+1, G479 and G480. In this period, a signal for controlling the transistor 432 which is electrically connected to the scanning signal line 410 of each row from G1 to G480 is supplied. In the timing chart in which G1, G2, Gn, Gn+1, G479 and G480 are described, the period F/3-Tw-Tawr in the shaded part is a period during which an image is displayed. In this period, RLED 412 is lit.

For example, when the period Tw is 2.78 ms, the period F/3-Tw-Tawr becomes a period 2.78 ms-Tawr. In addition, when the period Tw is 2.16 ms, the F/3-Tw-Tawr period becomes a period 3.40 ms-Tawr. By adjusting the period Tw, it is possible to rapidly write an image signal and display an image for a long period of time. Therefore, it is possible to secure a sufficient response time of the liquid crystal element. Therefore, it is possible for the display device to display a uniform image without display unevenness.

Since WAL is explained in FIG. 4, an explanation is omitted here.

BLPS is a signal line for controlling ON/OFF of the light source part 404. BLPS is supplied with a signal for controlling ON/OFF of the light source part 404. BLPS is supplied with the maximum value of a fluctuation of an amplitude of a signal during the period Tblon. When BLPS is supplied with the maximum value of the fluctuation of the amplitude of the signal, the light source part 404 is turned ON, that is, RLED 412 is lit. When BLPS is supplied with the minimum value of a fluctuation of an amplitude of the signal, the light source part unit 404 is turned OFF, that is, RLED 412 is not lit. The amplitude of the signal of the BLPS is, for example, 30V (0V to 30V).

VCOMS is a signal line for supplying a voltage to a common electrode. By common inversion, the maximum value of the fluctuation of the amplitude and the minimum value of the fluctuation of the amplitude of a signal supplied to a common electrode are switched. In FIG. 5, an example is shown in which the amplitude is 30V (0V to 30V). The maximum value of the fluctuation of the amplitude is 30V, and the minimum value of the fluctuation of the amplitude is 0V.

A data input line DIN is a signal line for supplying a voltage corresponding to an image signal to a pixel. An image signal RDATA is supplied in 1H in FIG. 5. An image signal GDATA is supplied in 2H. In 3H, an image signal BDATA is supplied. In FIG. 5, an example is shown in which a voltage corresponding to an image signal is a value between 0V and 30V. In the shaded part, the voltage corresponding to the image signal is indeterminate.

In 2H and 3H, the operation of 1H is repeated. However, in 2H, when BLPS turns ON the light source part 404, GLED 414 is lit, and when the light source part 404 is turned OFF, BLED is not lit. In 3H, when BLPS turns ON the light source part 404, BLED 416 is lit, and when the light source unit 404 is turned off, BLED 416 is not lit.

Figure 6:
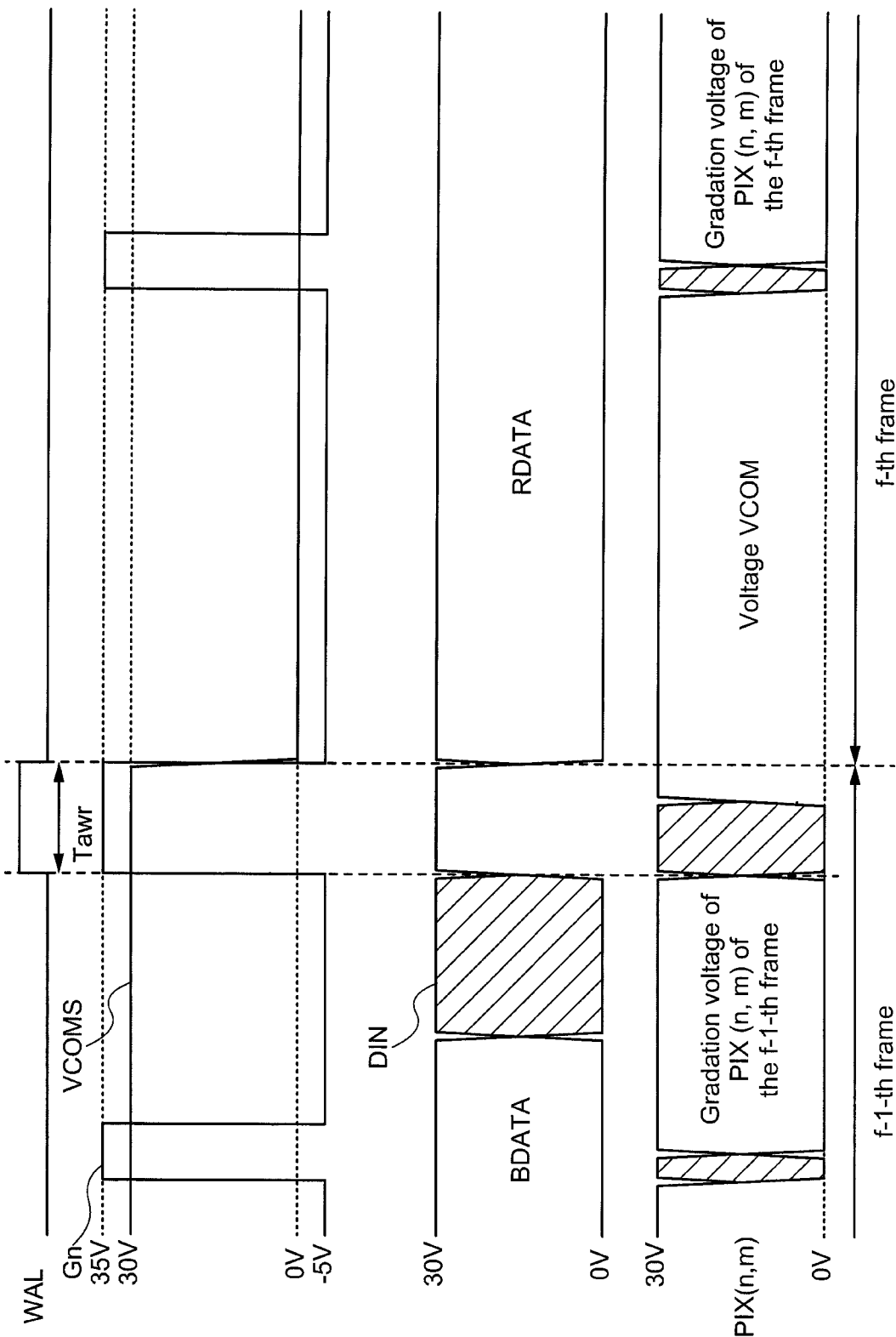
FIG. 6 is an example of a timing chart for explaining a driving method of a display device related to one embodiment of the present invention.

FIG. 6 is an example of a timing chart for explaining a driving method of a display device according to one embodiment of the present invention. FIG. 6 is a timing chart which uses pixels of n-th row and m-th column as an example. PIX (n, m) represents a pixel of n-th row and m-th column. In FIG. 6, f is a natural number of 2 or more.

Since WAL is explained in FIG. 4, an explanation is omitted here.

Gn is a scanning signal line 410 on an n-th row. Gn is supplied with a signal for turning the gate of the transistor 432 to an ON state from the scanning signal line drive circuit 508 and/or the scanning signal line drive circuit 510 in each of the f-1-th frame and the f-th frame respectively. It is possible write a voltage corresponding to an image signal to one of the liquid crystal elements 436 using a signal for turning the gate of the transistor 432 to an ON state. That is, a pixel is written with a voltage corresponding to an image signal. An image signal BDATA supplied to the data input line DIN is written in the f-1-th frame in FIG. 6. The image signal BDATA is a gradation voltage of PIX (n, m) of the f-1-th frame.

Since VCOMS is explained in FIG. 5, an explanation is omitted here.

Since the data input line DIN is explained in FIG. 5, an explanation regarding the same contents as in FIG. 5 is omitted. In FIG. 6, an image signal BDATA is supplied to the f-1-th frame. The f-th frame is supplied with an image signal RDATA. An example is shown in FIG. 6 in which a voltage corresponding to an image signal is a value between 0V and 30V. Furthermore, in the shaded area, a voltage corresponding to an image signal is indeterminate.

PIX (n, m) indicates a signal supplied to a pixel of n-th row and m-th column. In FIG. 6, an image signal BDATA supplied to the data input line DIN is written in the f-1-th frame. The image signal BDATA is a gradation voltage of PIX (n, m) of the f-1-th frame. The image signal RDATA supplied to the data input line DIN is written in the f-th frame. The image signal RDATA is a gradation voltage of PIX (n, m) of the f-th frame. In the period Tawr, the shaded part is supplied with a signal having an indeterminate voltage corresponding to an image signal. In the period Tawr, the maximum value of the fluctuation of the amplitude of the signal supplied to a common electrode is supplied after the signal having an indeterminate voltage corresponding to an image signal is supplied. In FIG. 6, the maximum value of the fluctuation of the amplitude of the signal supplied to the common electrode is the VCOM voltage, which is 30V. The gradation voltage is, for example, a voltage corresponding to an image signal.

Figure 7:
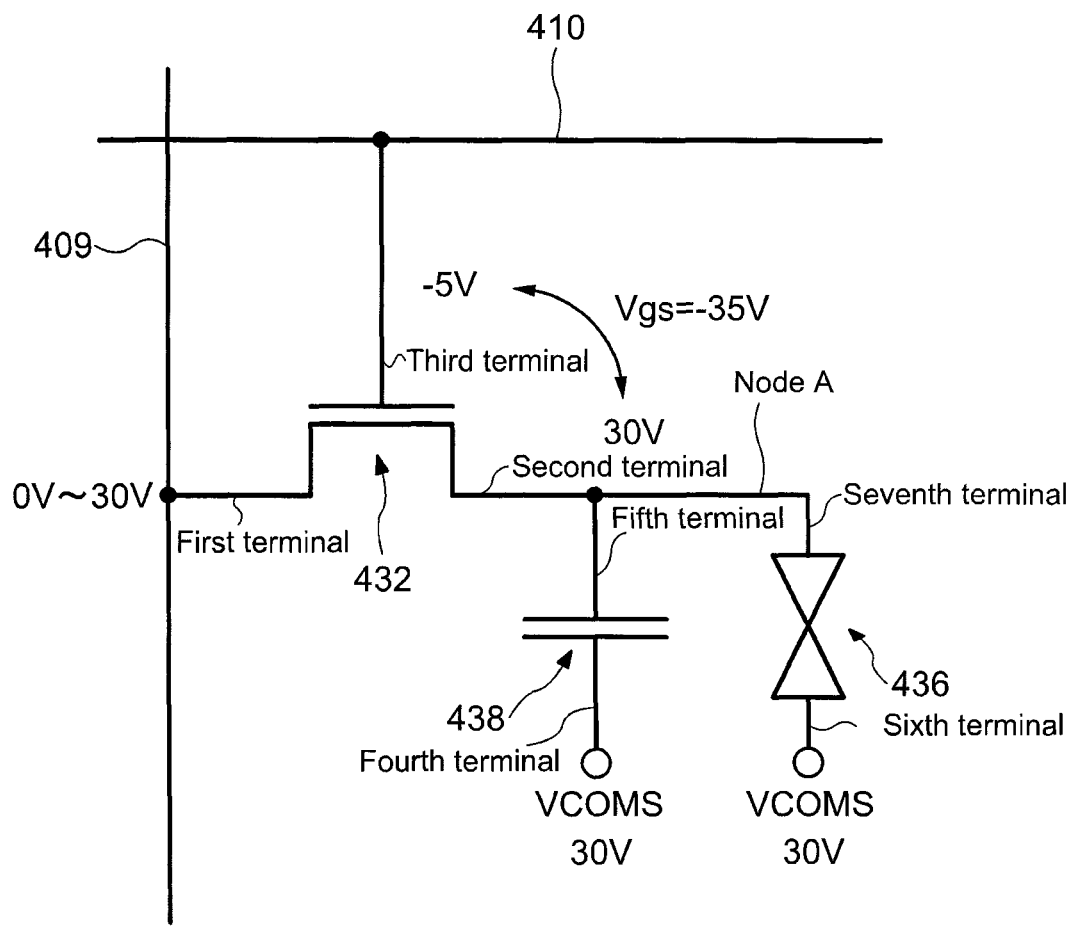
FIG. 7 is a schematic diagram showing an example of a voltage applied to a pixel circuit when using a driving method of a display device related to one embodiment of the present invention.
Figure 8:
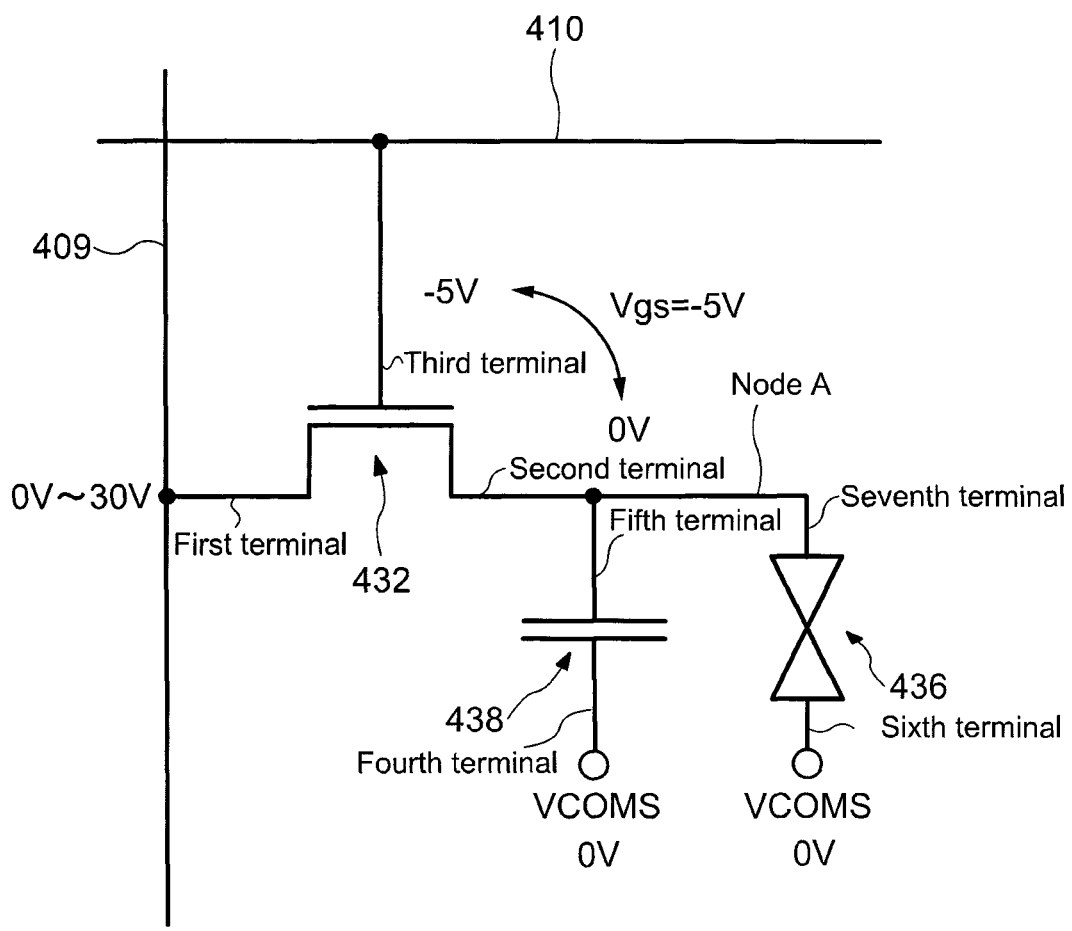
FIG. 8 is a schematic diagram showing an example of a voltage applied to a pixel circuit when using a driving method of a display device related to one embodiment of the present invention.

FIG. 7 and FIG. 8 are schematic diagrams showing examples of voltages to be applied to a pixel circuit when using the driving method of a display device according to one embodiment of the present invention.

In the display device according to one embodiment of the present invention, a constant voltage is applied to all the pixels in the display device before common inversion is performed. As explained using FIG. 4, the constant voltage is the maximum value of the fluctuation of the amplitude of the signal supplied to the common electrode, and is, for example, 30V. FIG. 7 shows a pixel circuit after 30V is written to a node A before common inversion is performed. That is, a pixel circuit in the period Tawr is shown. −5V is applied to the third terminal. The voltage Vgs between the second terminal and the third terminal of the transistor 432 is −35V. Therefore, a current does not flow between the first terminal and the second terminal of the transistor 432. That is, the transistor 432 is in an OFF state.

FIG. 8 shows 30V which is a constant voltage is written to the node A and further shows a pixel circuit after common inversion. That is, the pixel circuit in the period Tvcom is shown. −5V is applied to the third terminal. By performing common inversion, the potential of the common electrode changes from 30V to 0V. At the same time, the potential of the node A changes from 30V to 0V. Therefore, Vgs becomes −5V. Therefore, the transistor 432 is maintained in an OFF state, and a current does not flow between the first terminal and the second terminal of the transistor 432. Therefore, the transistor 432 can hold a voltage corresponding to an image signal.

Furthermore, although not shown in the diagram, in FIG. 6 to FIG. 8, the third terminal is applied with 35V when a voltage corresponding to an image signal is written to the node A. Therefore, a signal with a difference of 40V (−5V to 35V) between the maximum value and the minimum value of the fluctuation of the amplitude is supplied to the third terminal. Furthermore, 35V is applied to the third terminal when the maximum value of the fluctuation of the amplitude of the signal supplied to the common electrode is written to the node A. Therefore, a signal with a difference of 40V (−5V to 35V) between the maximum value and the minimum value of the fluctuation of the amplitude is supplied to the third terminal.

Figure 9:
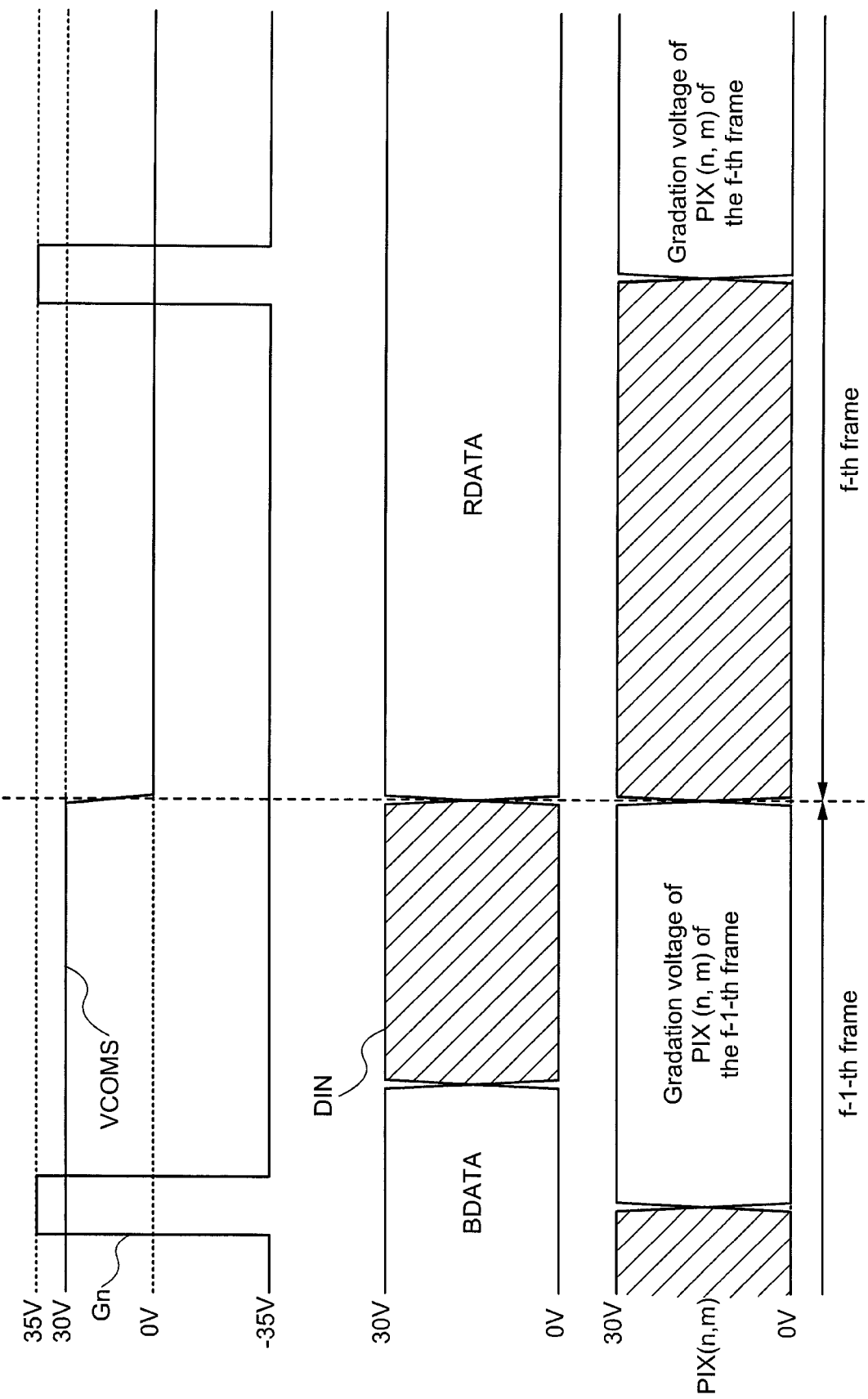
FIG. 9 is an example of a timing chart for explaining a driving method of a liquid crystal display device using a conventional PDLC.

FIG. 9 is an example of a timing chart for explaining a driving method of a liquid crystal display device using a conventional PDLC. FIG. 9 is different compared to the driving method of the display device according to the embodiment of the present invention shown in FIG. 6 in that there is no period Tawr.

Figure 10:
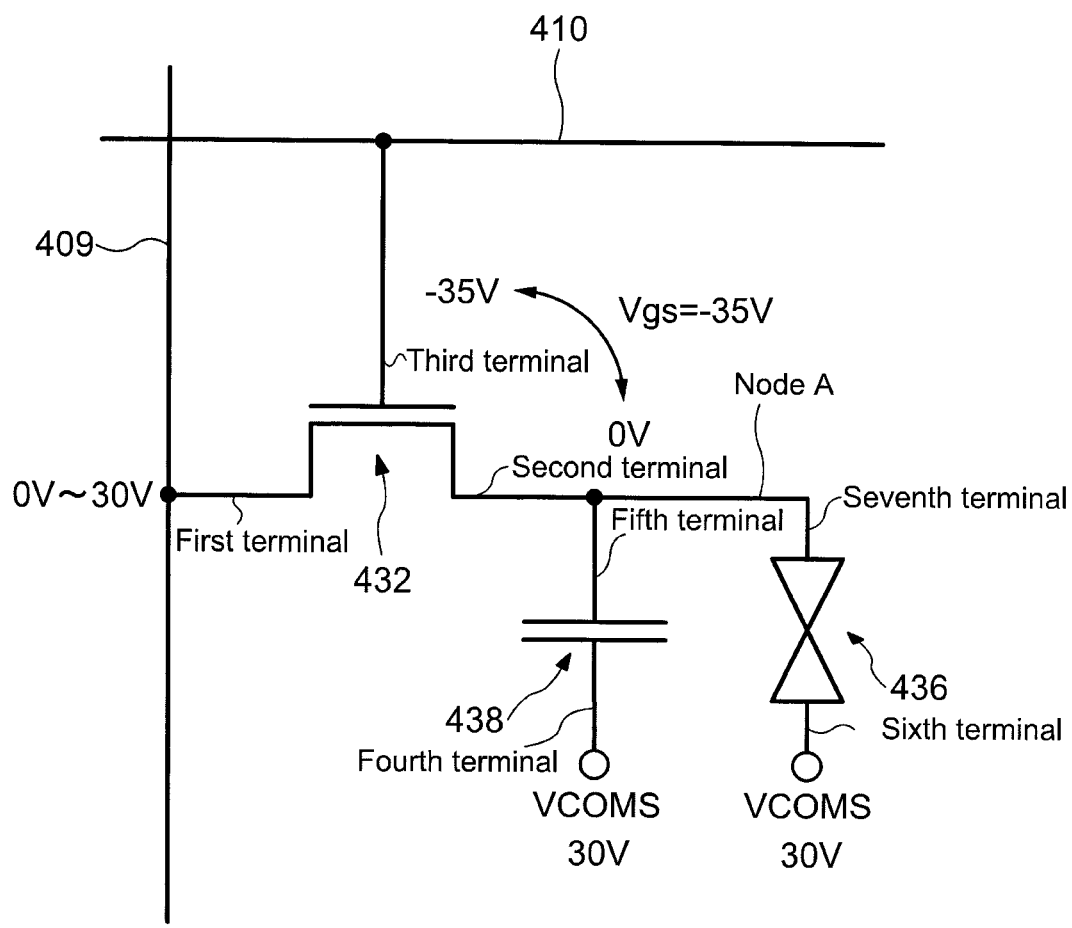
FIG. 10 is a schematic diagram showing an example of a voltage applied to a pixel circuit in a liquid crystal display device using a conventional PDLC.

FIG. 10 and FIG. 11 are schematic diagrams showing examples of voltages applied to a pixel circuit in a liquid crystal display device using a conventional PDLC. Furthermore, he pixel circuit is explained using FIG. 8 the same as the embodiment of the present invention.

FIG. 10 shows a pixel circuit after 0V is written to the node A. The sixth terminal is a common electrode, and 30V which is the maximum value of the fluctuation of the amplitude of the signal supplied to VCOMS is supplied. The third terminal is applied with −5V. The voltage Vgs between the second terminal and the third terminal of the transistor 432 is −35V. Therefore, a current does not flow between the first terminal and the second terminal of the transistor 432. That is, the transistor 432 is in an OFF state.

FIG. 11 shows that 0V is written to the node A and furthermore a pixel circuit after common inversion is performed. The third terminal is applied with −35V. By performing common inversion, the potential of the common electrode changes from 30V to 0V. At the same time, the potential of the node A changes from 0V to −30V. Therefore, Vgs becomes −5V. Therefore, the transistor 432 is maintained in an OFF state, and a current does not flow from the source or the drain of the transistor 432 between the first terminal and the second terminal of the transistor 432. Therefore, it is possible for the transistor 432 to hold a voltage corresponding to the image signal.

As shown in FIG. 9 to FIG. 11, in a liquid crystal display device using a conventional PDLC, performing common inversion causes the potential of the node A to decrease by the amount by which the potential of the common electrode decreases. A signal having an amplitude of 70V (−35V to 35V) is supplied to the gate of the transistor 432. Furthermore, 35V is applied to the gate of the transistor 432 when the maximum value of the fluctuation of the amplitude of the signal supplied to the common electrode is written to one of the liquid crystal elements 436. Therefore, a signal having an amplitude of 70V (−35V to 35V) is supplied to the gate of the transistor 432.

As explained using FIG. 6 to FIG. 8, in the display device according to one embodiment of the present invention, a constant voltage is applied to all pixels of the display device before common inversion is performed. In the present invention, the amplitude of a signal supplied to the gate of the transistor included in a pixel is 40V. As explained using FIG. 9 to FIG. 11, conventionally, the amplitude of a signal supplied to the gate of a transistor included in a pixel is 70V. Therefore, in the display device according to one embodiment of the present invention, it is possible to reduce the amplitude of the signal supplied to the gate of the transistor included in a pixel by about 40%. In addition, it is possible to improve the withstand voltage of the display device by about 40%.

Figure 12:
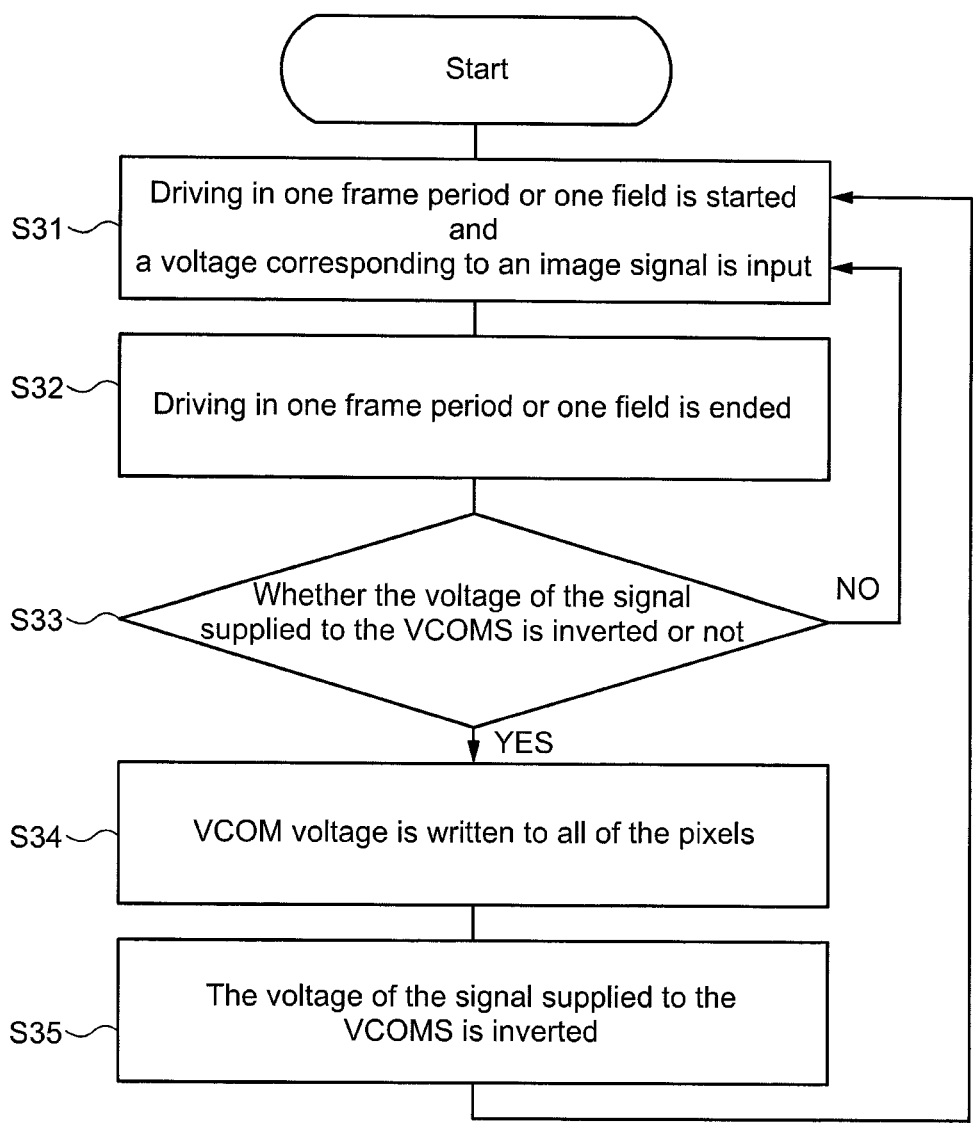
FIG. 12 is an example of a flow chart for explaining a driving method of a display device related to one embodiment of the present invention.

FIG. 12 is an example of a flowchart for explaining a driving method of a display device according to one embodiment of the present invention. Here, an example is shown in which the method of driving the display device includes combining frame inversion driving and common inversion driving.

Driving of the display panel 500 is started. Driving in one frame period is started and a voltage corresponding to an image signal is input (step 31 (S31)). Driving in one frame period is ended (step 32 (S32)). Whether the voltage of the signal supplied to the VCOMS is inverted is checked, that is, whether or not common inversion driving is performed (step 33 (S33)). In the case when the voltage of the signal supplied to the VCOMS is not inverted, that is, in the case of NO, common inversion driving is not performed, the process returns to S31. In the case where the voltage of the signal supplied to VCOMS is inverted, that is, in the case of YES, common inversion driving is performed, the VCOM voltage is written to all of the pixels (step 34 (S34)). After writing the VCOM voltage to all of the pixels, the voltage of the signal supplied to VCOMS is inverted (step 35 (S35)). Next, the process returns to S31 and driving is performed.

The display device according to one embodiment of the present invention can reduce the amplitude fluctuation of the signal supplied to the gate of the transistor included in a pixel. Therefore, for example, the display device according to one embodiment of the present invention can reduce the operating voltage of the scanning signal line drive circuit 508 and the scanning signal line drive circuit 510. In addition, the display device according to one embodiment of the present invention can cut circuits which requires a high voltage, for example, a level shifter and/or the buffer, and reduce the size of a voltage generation circuit. Therefore, the display device according to one embodiment of the present invention can reduce circuit scale. Furthermore, since the display device according to one embodiment of the present invention can reduce circuit scale, it is possible to reduce the length of wiring connecting each circuit. Therefore, in the display device according to one embodiment of the present invention, since the resistance of wiring and parasitic capacitance can be reduced, the delay of the signal between circuits can be reduced. That is, the display device according to one embodiment of the present invention can improve the operation margin of the display device.

By using the display device and the driving method according to one embodiment of the present invention, it is possible to reduce the amplitude fluctuation of the voltage applied to the transistor of the display device. That is, the operating voltage can be reduced. Therefore, power consumption of the display device can be reduced. In addition, it is possible to decrease the required value of a withstand voltage of a transistor in the display device. Furthermore, since it is possible to reduce an operating voltage, the circuit structure of the display device can be simplified and circuit scale can be reduced.

Second Embodiment

In the present embodiment, another example of a driving method of a display device according to one embodiment of the present invention is explained. Furthermore, an explanation related to the same structure as in the first embodiment may be omitted.

Figure 13:
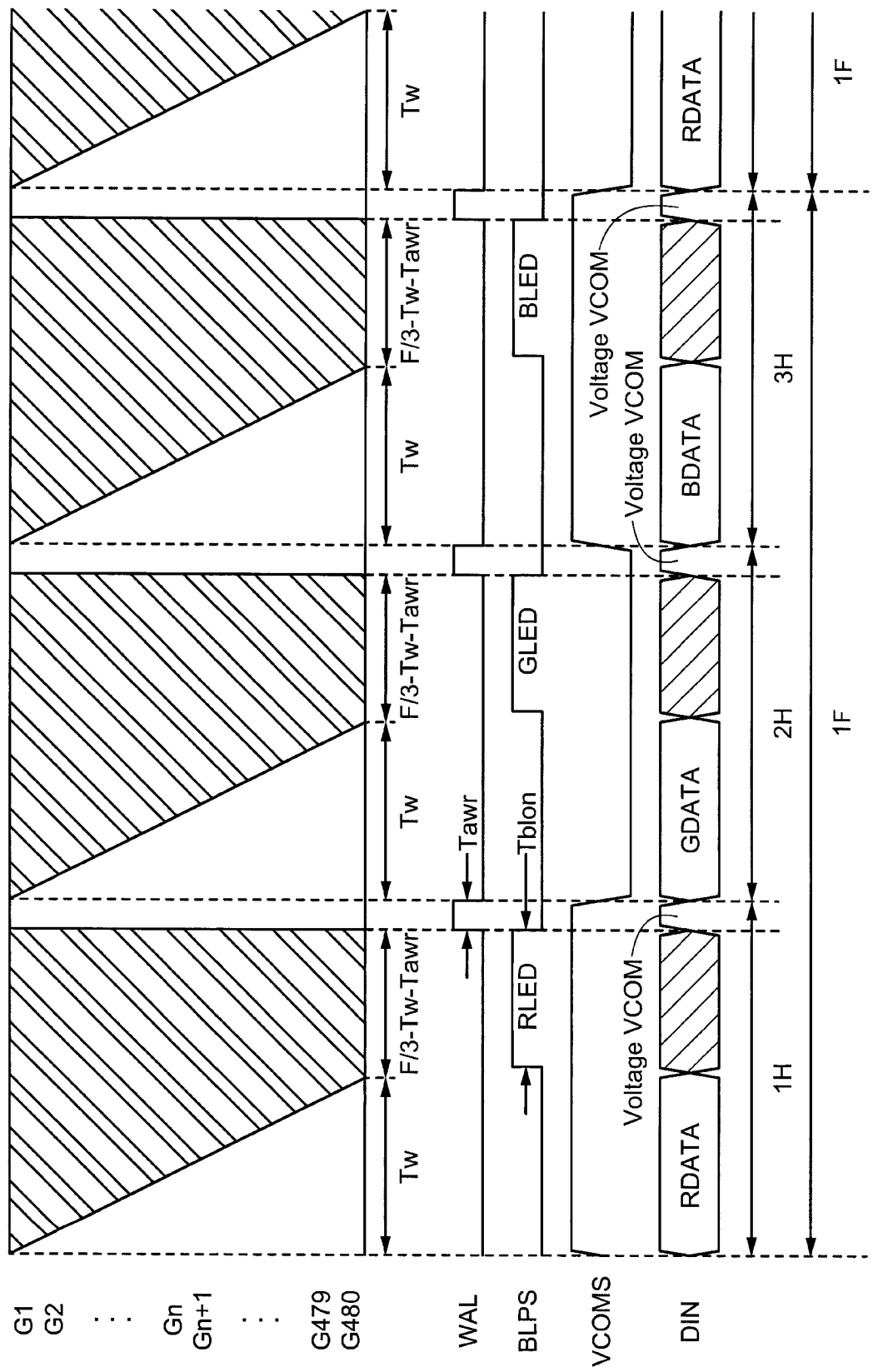
FIG. 13 is an example of a timing chart for explaining a driving method of a display device related to one embodiment of the present invention.

FIG. 13 is a timing chart for explaining another example of a driving method of the display device according to one embodiment of the present invention. FIG. 13 is different from the timing chart shown in FIG. 5 in that the signal supplied to VCOMS is inverted for every field period. The remaining points are the same as those in FIG. 5.

Comparing FIG. 13 with FIG. 5, the inversion cycle of a signal supplied to VCOMS is reduced. Therefore, by using the driving method according to one embodiment of the present invention, it is possible to provide a display device which can prevent burn-in of a liquid crystal and realize good display.

Third Embodiment

In the present embodiment, yet another example of a driving method of the display device according to one embodiment of the present invention is explained. Furthermore, an explanation of structures similar to those of the first embodiment or the second embodiment may be omitted.

Figure 14:
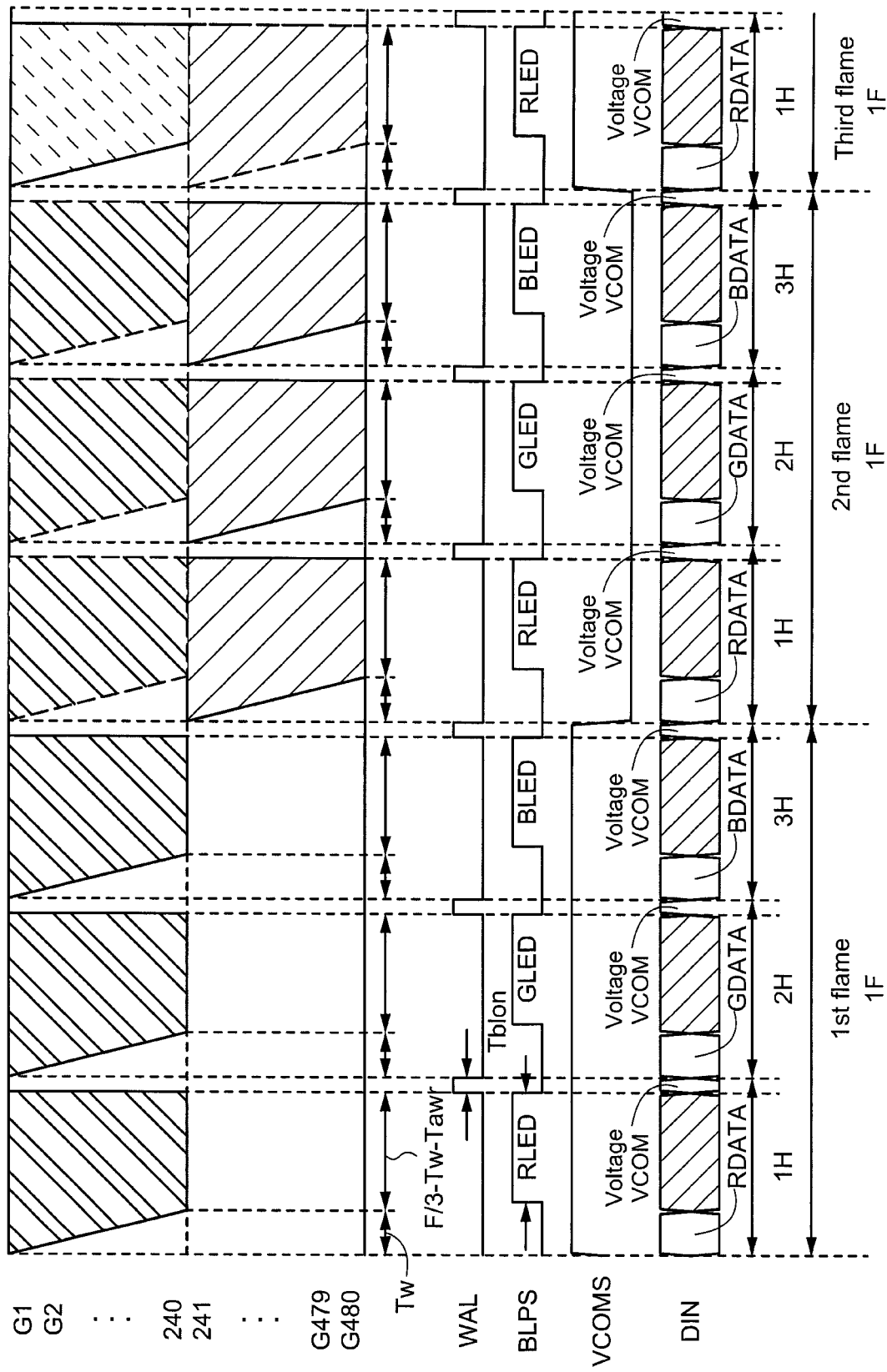
FIG. 14 is an example of a timing chart for explaining a driving method of a display device related to one embodiment of the present invention.

FIG. 14 is a timing chart for explaining yet another example of a driving method of the display device according to one embodiment of the present invention. FIG. 14 is different from the timing chart shown in FIG. 5 in that the screen of the display panel 500 is divided in half. Since the remaining points are the same as in FIG. 5, an explanation is omitted.

1H in the 1st frame is explained. A timing chart in which G1, G2, G240, G241, G479 and G480 are written indicates that a voltage corresponding to an image signal is written to a pixel 502 of the display panel 500, and an image is displayed on the display panel 500. In the timing chart written with G1, G2, G240, G241, G479 and G480, Tw is a period during which a voltage corresponding to an image signal is written to a pixel 502 in the order from G1 and G2 to G240. In this period, a signal for controlling the transistor 432 which is electrically connected to the scanning signal line 410 of each row of G1 to G240 is supplied. In the timing chart written with G1, G2 and G240, the period F/3-Tw-Tawr in the shaded part is a period during which an image is displayed. In this period, RLED 412 is lit.

In 1H, voltages corresponding to image signals are written on half of the screen from G1 and G2 to G240 in the screen of the display panel 500, and an image is displayed.

In the second frame, the operations from 1H to 3H of the first frame are repeated. However, the second frame is a period during which a voltage corresponding to an image signal is written to the pixel 502 in the order from G241 to G479 and G480. That is, voltages corresponding to image signals are written on half of the screen from G241 to G479 and G480 in the screen of the display panel 500, and an image is displayed.

Furthermore, in the case when the display panel 500 is divided into halves and the display panel 500 is utilized, the scanning signal line drive circuit may be divided into a circuit for controlling G1 to G240 and a circuit for controlling G241 to G480. At this time, GSP and GCK may be supplied to each of the divided circuits respectively. In addition, a signal supplied to a common electrode of a liquid crystal element may be a signal for controlling the first common electrode supplied to the common electrode of the liquid crystal element of a pixel connected from G1 to G240, and a signal for controlling the second common electrode supplied to the common electrode of the liquid crystal element of a pixel connected from G241 to G480. The signal for controlling the first common electrode and the signal for controlling the second common electrode may be independent from each other and may have different timings. A circuit in the case where the screen of the display panel 500 is divided into halves and the display panel 500 is utilized is not limited to this structure. A suitably examined circuit structure may be applied as long as it does not deviate from the present invention.

For example, in one embodiment of the present invention, the period Tw is 1.08 ms. In addition, in one embodiment of the present invention, 1F is set to 16.68 ms. Comparing FIG. 14 with FIG. 5, FIG. 14 shows that half of the screen of the display panel 500 is written rapidly with an image signal when a period during which a voltage corresponding to an image signal written to a pixel 502 is 1.08 ms. In addition, comparing FIG. 14 with FIG. 5, FIG. 14 shows that an image is displayed for a long time when the period during which the image is displayed is 4.48 ms-Tawr. That is, since it is possible to rapidly write an image signal and the image can be displayed for a long period of time, the response time of the liquid crystal element can be sufficiently secured. Therefore, the display device can display a uniform image without display unevenness. In addition, for example, different information can be displayed on one screen of the display panel 500, for example, it is possible to display different information in one screen of the display panel such as displaying character information on half of the screen of the display panel 500 and displaying image information on the other half.

Each embodiment described above as embodiments of the present invention can be carried out by appropriate combination as long as there is no mutual contradiction.

In the present specification, a display device and a driving method have mainly been exemplified as disclosed examples. However, the invention described in the present specification can be applied to a liquid crystal display device or an electronic paper type display device having an electrophoretic element and the like. In addition, it is possible to apply the invention without particular limitation from medium sized display devices to large sized display devices.

Even if there are other actions and effects different from the actions and effects brought about by the aspects of each embodiment described above, those obvious from the description of the present specification or those that could be easily predicted by a person ordinarily skilled in the art will naturally be interpreted as being provided by the present invention.

What is claimed is:

1. A display device comprising:
   a plurality of first electrodes;
   a plurality of second electrodes arranged facing the plurality of first electrodes respectively;
   an electro-optical element arranged sandwiched between the plurality of first electrodes and the plurality of second electrodes, and changing optical characteristics based on an applied voltage;
   a transistor including a first terminal connected to an image signal line, a second terminal connected to one of the plurality of first electrodes, and a gate terminal connected to a scanning signal line and controlling conduction between the first terminal and the second terminal; and
   a control circuit controlling a voltage supplied to the image signal line, the scanning signal line and the plurality of second electrodes;
   applying a positive polarity first voltage with respect to the plurality of first electrodes to the plurality of second electrodes, and applying a voltage according to an image signal to one of the plurality of first electrodes in a first time period;
   applying a negative polarity second voltage with respect to the plurality of first electrodes to the plurality of second electrodes, and applying a voltage according to an image signal to one of the plurality of first electrodes in a second time period after the first time period; and
   applying to the plurality of first electrodes a common voltage larger than a minimum value of an allowable range of a voltage according to an image signal applied to one of the plurality of first electrodes and determined in a range equal to or less than the first voltage in a third time period between the first time period and the second time period.

2. The display device according to claim 1, wherein each of the plurality of second electrodes arranged facing the plurality of first electrodes are electrically connected respectively.

3. The display device according to claim 1, wherein the electro-optical element is a liquid crystal element.

4. The display device according to claim 1, further comprising:
   a light source part including a light source facing towards the electro-optical element, and a voltage for switching OFF the light source is applied in the third time period.

5. The display device according to claim 1, further comprising:
   a light source part including a light source facing towards the electro-optical element;
   wherein
   the control circuit includes a light source control part; and
   the light source control part applies a voltage for switching OFF the light source to the light source part in the third time period.

6. The display device according to claim 1, wherein the control circuit applies a voltage according to an image signal in the first time period to one of the plurality of first electrodes by controlling the image signal line and the scanning signal line, applies a voltage according to an image signal in the second time period to one of the plurality of first electrodes by controlling the image signal line and the scanning signal line, and applies a common in the third time period to the plurality of first electrodes by controlling the image signal line and the scanning signal line.

7. A method for driving a display device, the display device including a plurality of first electrodes:
   a plurality of second electrodes arranged facing the plurality of first electrodes respectively;
   an electro-optical element arranged sandwiched between the plurality of first electrodes and the plurality of second electrodes, and changing optical characteristics based on an applied voltage;
   a transistor including a first terminal connected to an image signal line, a second terminal connected to one of the plurality of first electrodes, and a gate terminal connected to a scanning signal line and controlling conduction between the first terminal and the second terminal; and
   a control circuit for controlling a voltage supplied to the image signal line, the scanning signal line and the plurality of second electrodes,
   the method comprising:
   applying a positive polarity first voltage with respect to a plurality of first electrodes to a plurality of second electrodes arranged facing the plurality of first electrodes;
   applying a voltage according to an image signal to one of the plurality of first electrodes;
   applying to the plurality of first electrodes a common voltage larger than a minimum value of an allowable range of a voltage according to an image signal applied to one of the plurality of first electrodes;

applying a negative polarity voltage with respect to the plurality of first electrodes to the plurality of second electrodes; and applying a voltage corresponding to an image signal to one of the plurality of first electrodes.

8. The method for driving a display device according to claim 7, wherein each of the plurality of second electrodes arranged facing the plurality of first electrodes are electrically connected respectively.

9. The method for driving a display device according to claim 7, wherein the electro-optical element is a liquid crystal element.

10. The method for driving a display device according to claim 7, wherein a common voltage determined in a range equal to or less than the first voltage is applied and a voltage for turning off a light source part is applied.

* * * * *